United States Patent [19]
Guilford

[11] Patent Number: 5,531,137
[45] Date of Patent: Jul. 2, 1996

[54] CAM FOLLOWER ASSEMBLY

[75] Inventor: Werner B. Guilford, Hulmeville, Pa.

[73] Assignee: Roller Bearing Company of America, Trenton, N.J.

[21] Appl. No.: 337,774

[22] Filed: Nov. 14, 1994

Related U.S. Application Data

[63] Continuation-in-part of Ser. No. 972,231, Nov. 5, 1992, abandoned, which is a continuation of Ser. No. 707,427, May 28, 1991, abandoned, which is a continuation of Ser. No. 217,874, Jul. 12, 1988, abandoned.

[51] Int. Cl.$^6$ ............................................. F16H 53/06
[52] U.S. Cl. .................................................. 74/569
[58] Field of Search ........................... 74/569; 384/475, 384/484, 551, 568, 903

[56] References Cited

U.S. PATENT DOCUMENTS 4,027,930  6/1977  Bodensieck ........................ 384/568

FOREIGN PATENT DOCUMENTS

| 903321 | 9/1945 | France | 384/568 |
| 715579 | 9/1954 | United Kingdom | 384/568 |
| 2276213 | 9/1994 | United Kingdom | 384/568 |

*Primary Examiner*—Flemming Saether
*Attorney, Agent, or Firm*—Paul & Paul

[57] ABSTRACT

A cam follower assembly is provided which has a bearing outer ring on an inner cylinder, with two rows of cylindrical rollers there-between. The rollers are provided with crowned end portions and are held in place by inturned flanges at ends of the bearing outer ring. A thrust washer is carried by the inner cylinder, and projects outwardly into a space between the two rows of cylindrical rollers, to accommodate endwise thrust load, such that endwise thrust is transferred between the bearing outer ring and the inner cylinder by passing through the rollers of a single row of cylindrical rollers. The inner cylinder is provided with a mounting shaft adapted to be mounted in a carrier and fastened together therewith.

20 Claims, 3 Drawing Sheets

CAM FOLLOWER ASSEMBLY

BACKGROUND OF THE INVENTION

This is a continuation in part of U.S. Ser. No. 07/972,231 filed Nov. 5, 1992, now abandoned, which is a continuation application of U.S. Ser. No. 707,427 filed on May 28, 1991, now abandoned, which is a continuation application of U.S. Ser. No. 217,874 filed Jul. 12, 1988, now abandoned.

Due to machining tolerances and deflections under load, it is rarely possible to have a cam follower perfectly aligned with its track. The resulting misalignment causes thrusting of the outer ring. The invention minimizes the effects of outer ring thrust, such as wear and increased operating temperature, while improving sealing properties and load capacity.

In cam follower assemblies of prior art types, it is known to use a bearing assembly that has an outer ring disposed about a shaft, with one or more rows of cylindrical rollers between the shaft or inner ring and the outer ring. The bearing assembly, consisting of outer ring, inner ring or shaft and rolling elements, is retained together, generally by pressing L-shaped retaining washers into the outer ring flanges. Thus, the bearing assembly is held together by friction forces alone. Additionally, such prior art devices, in the case in which more than one row of cylindrical rollers is used, cause the thrust load to be passed through both rows of rollers before transmission of such load to a flange or an end plate or washer.

Additionally, such prior art arrangements as described above inhibit the use of lip seals, especially when such end plates or washers are used. Lip seals are generally desirable to retain lubrication within the bearing and to exclude external contaminants. Where mounting of such seals is prevented or inhibited, the overall assembly becomes less desirable.

Additionally, if the press fit of the retaining washers is not sufficiently tight, or if the bearing assembly is not axially clamped in the application, such prior art assemblies may become disengaged.

SUMMARY OF THE INVENTION

The present invention provides a cam follower assembly in which the outer ring is mounted on a shaft, with a pair of axially spaced-apart rows of cylindrical rollers being disposed between the shaft and the ring, with the outer ring having inwardly directed flanges at axial spaced-apart ends thereof, for purposes of accommodating end thrust, and wherein the shaft is provided with a ring mounted thereon and projecting into the space formed between the two rows of cylindrical rollers, and between the bearing outer ring and the shaft for accommodating end thrust from a row cylindrical rollers. A mounting portion extends axially from the shaft, for mounting the cam follower assembly on a carrier member, and fastening means are provided for securing the same thereagainst. A portion of the cam follower assembly that comprises the shaft extends endwise farther than the outer end of the adjacent bearing outer ring, to provide a mounting shoulder for facilitating mounting the assembly against a carrier member. Suitable plugs and grease fittings, as well as longitudinal and transverse grease or other lubrication channels are optionally provided.

Accordingly, it is a primary object of this invention to provide a novel cam follower assembly.

It is a further object of this invention to provide a novel cam follower assembly in which the thrust loads are handled between the outer ring and the shaft, through a single row of cylindrical rollers.

It is a further object to accomplish each of the above objects, wherein a thrust ring is carried on the shaft.

It is yet another object of the present invention to accomplish each of the above objects, wherein a thrust ring extends axially outwardly into a space between axially spaced-apart rows of cylindrical rollers.

It is a further object of this invention to accomplish the above objects, wherein lip seals may be utilized together with thrust-absorbing flanges of the bearing outer ring.

It is another object of this invention to provide a means for facilitating thrust load distribution, wherein the bearing rollers are crowned at each end thereof.

Other objects and advantages will be readily understood, upon a reading of the following brief description of the drawing figures, detailed description of the preferred embodiment, and the appended claims.

BRIEF DESCRIPTION OF THE DRAWING FIGURES

DETAILED DESCRIPTION OF THE PREFERRED EMBODIMENTS

Figure 1:
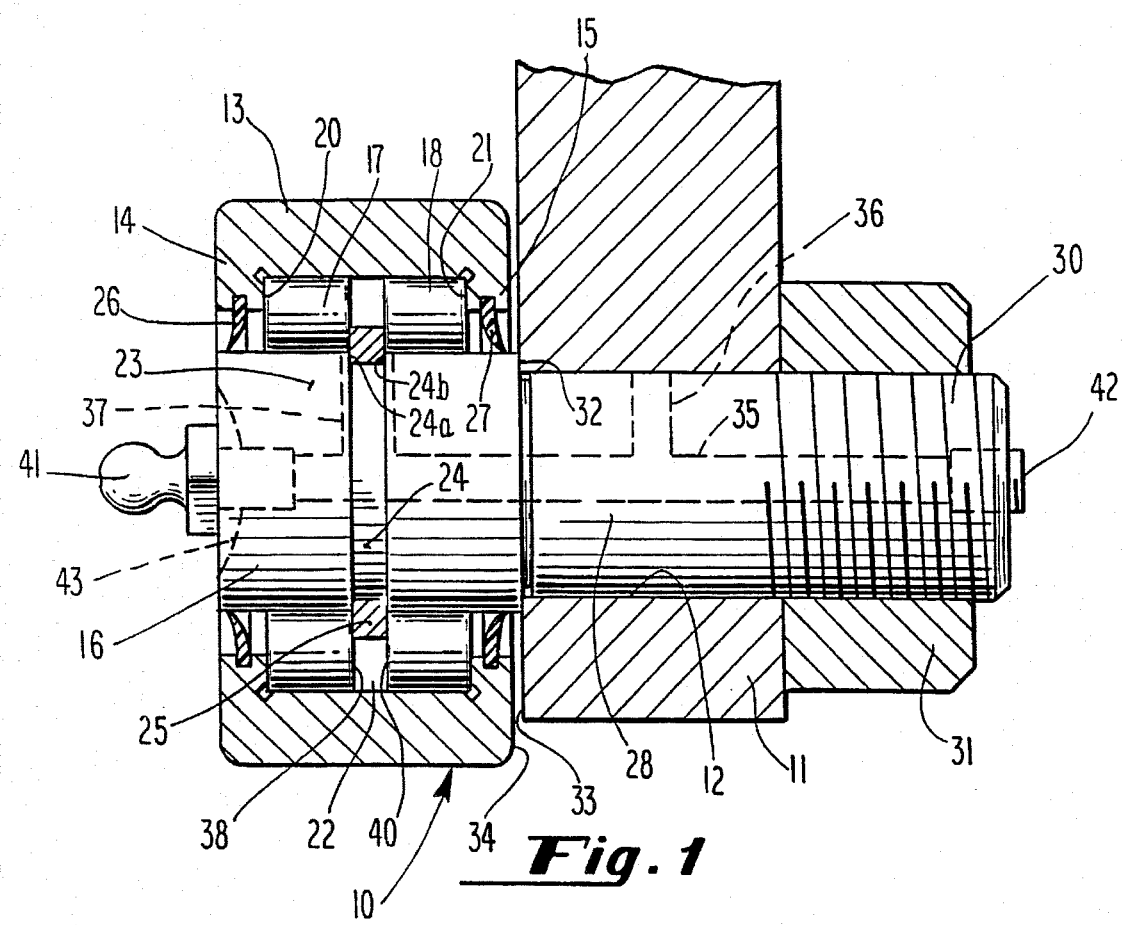
FIG. 1 is a longitudinal sectional view, taken through a cam follower assembly in accordance with this invention, wherein the assembly is mounted on a carrier member and secured thereto, by a suitable fastening member, with the carrier member being partially fragmentally illustrated, and with lubrication channels being illustrated in phantom.

Referring now to the drawings in detail, reference is first made to FIG. 1, wherein the cam follower assembly is generally designated by the numeral 10, carried by a suitable carrier member 11, within a bore or throughhole 12, thereof.

The cam follower assembly 10 comprises a bearing outer ring 13, of cylindrical formation, with inwardly extending cylindrical flange portions 14 and 15, at axially spaced-apart ends thereof.

Disposed within the bearing outer ring 13, is an inner bearing member 16, of shaft-like construction.

Between the member or shaft 16 and 13 are two annular rows of cylindrical rollers 17 and 18, disposed respectively against radially inwardly directed flanges 14 and 15, at inner ends 20 and 21, respectively, of the flanges 14 and 15.

A generally ring-like space 22 is thus provided between the rows of rollers 17 and 18.

A split ring (i.e., having a substantially radial opening therein to accommodate the ring stretched open over the periphery 23 of the inner bearing member or shaft 16) is provided, in snap-on relation to the periphery 23 of the shaft 16, in an annular groove 24 thereof, with the ring 25 extending radially outwardly into the space 22 between the rows 17 and 18, to retain the assembly securely and to accommodate the transmission of the load from the outer ring 13, and especially from one of the flanges 14, and 15 thereof, through only a single row of cylindrical rollers 17 or 18, through the thrust ring 25, and to the shaft 16 in which the ring 25 is mounted.

The groove 24 is provided having sharp corners 24a, 24b on its edges.

Preferably the thrust ring 25 is provided to be slightly larger than the annular groove 24 in which the ring 25 is carried to allow the thrust ring 25 to freely rotate within the groove 24. A pair of seals 26 and 27 having single or multiple sealing lips are disposed in grooves as shown in the flange portions 14 and 15, with the seals 26 and 27 serving to retain lubricant therebetween, with the radial inner-most ends of the seals 26 and 27 being disposed on the periphery 23 of the shaft 16 in shaft-wiping relationship, as shown.

The shaft 16 is provided with a shaft mounting portion 28 extending axially from one end thereof, and is provided generally with a threaded portion 30 on its right-most end thereof as viewed in FIG. 1. A suitable fastener of the mounting nut type 31 or the like, is provided in threaded engagement with the portion 30 of the shaft, for securely mounting the assembly 10 on the carrier member, as shown.

It will be noted that the shaft 16 is provided with a shoulder 32 as shown at right-most end, for engagement against a surface 33 of the carrier member, for secure mounting of the inner bearing member potion of the assembly 10 against the carrier member upon tightening of the fastening means 31. In this regard, it will be noted that the shoulder 32 extends rightwardly beyond the rightward longitudinal extension 34 of the outer bearing ring 13, as shown in FIG. 1, in order to assure that the surface 32, rather than the surface 34, engages against the mounting surface 33.

Alternatively, the stud of shaft 16 could consist of a straight single diameter shaft with no shoulder 32, but with a snap ring or other retention device put into its place, which individually or in conjunction with a hardened thrust washer engages the mounting surface 33.

An optional longitudinal lubrication channel 35 is provided, extending endwise of the shaft 16, from one end to the other as shown in FIG. 1. A pair of transverse lubrication channels 36 and 37 are shown, extending for the lubrication channel 35, to the bore 12 of the carrier member 11 and the innermost axially spaced-apart end portions 38 and 40 of the rows of cylindrical rollers 17 and 18, respectively, the latter for purposes of lubrication of the rollers 17 and 18 via a transverse channel 37.

At either end of the shaft 16 as illustrated in FIG. 1, a grease or other lubrication fitting 41 may be attached, for facilitating introduction of lubricant into the channel 35, and the bearing proper and at the opposite end of the shaft 16, a plug 42 is provided, for removable engagement therein.

At the left-most end of shaft 16 as is viewed in FIG. 1, a slot 43 is provided for facilitating mounting and removal of the assembly 10 relative to its carrier member 11, by accommodating a screwdriver blade therein after removal of the fitting 41.

It will be noted that the inner bearing member 23 of the shaft 16 is integral with the shaft 16, as is the axial extension 28 and threaded portion 30 thereof, preferably for constructing the assembly of a minimum of parts.

It will also be noted that the thrust ring 25, together with the inwardly extending flanges 14 and 15 of the bearing outer ring, facilitates holding the assembly together.

It will also be apparent that, with the arrangement described above, the thrust loads from the outer ring to the shaft, or the converse, may readily be accommodated through a single row of rollers, through the thrust ring 25.

It will be apparent that the rollers 17 and 18 will generally be of hardened steel construction, and that the bearing outer ring 13 and inner shaft 16 will also generally be of metal, preferably steel construction, as will the thrust ring 25. The lip seals 26 and 27 will generally not be of metal construction, but may be suitable natural or synthetic construction, of leather or suitable thermoplastic materials, such as neoprene or the like.

Figure 3:
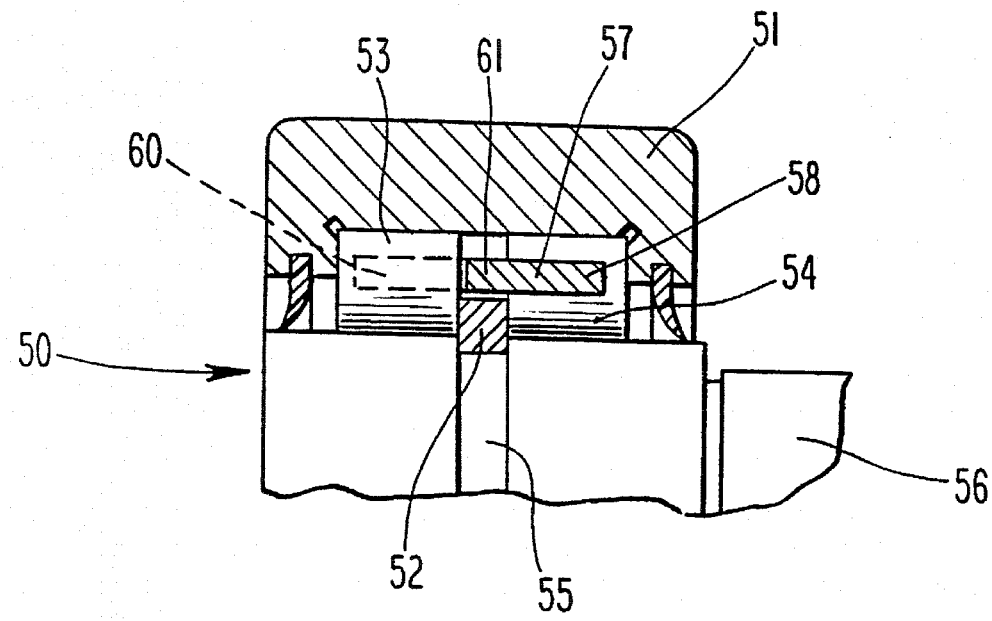
FIG. 3 is a fragmentary longitudinal sectional view, similar to a portion of that of FIG. 1, but illustrating a modified cam follower assembly, in which there is less than a full complement of rollers in each row, separated by a cage, and which represents a modified version of the assembly of FIG. 1.

With reference now to FIG. 3, in detail, it will be seen that the assembly 50 comprises a bearing outer ring 51, with a thrust ring 52 disposed between rows of rollers 53 and 54 with the ring 52 being carried in annular groove 55 in a shaft 56, as in the embodiment of FIG. 1. However, in the embodiment of FIG. 3, a cage 57 (well known per se) is utilized, having rightward extending portions and leftward extending portions 58 and 60, respectively, as illustrated, extending between and separating adjacent rollers 54 and 53, respectively, with the portions 58 and 60 being connected to a central circumferential portion 61. This arrangement allows the use of fewer rollers making up a row of rollers, with a plurality of cage portions separating adjacent rollers. In the use of a cage, such as in the arrangement of this embodiment, design variations are made possible, such as the ability to increase internal grease storage space, and in the spacing of rollers to facilitate high speed applications.

Figure 4:
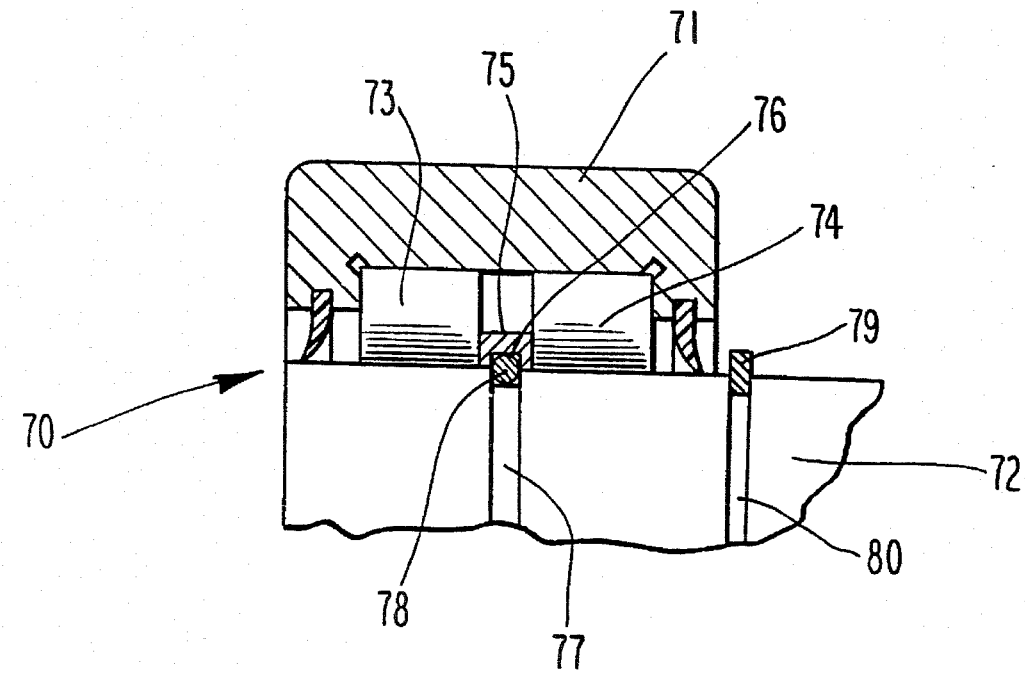
FIG. 4 is a fragmentary longitudinal sectional view of yet a further modified form of the assembly to that of FIG. 1 utilizing an alternative spacer ring arrangement to that of FIG. 1.

With reference to FIG. 4, another alternate embodiment is illustrated in the form of an assembly generally designed by the numeral 70, as comprising a bearing outer ring 91 disposed about a shaft 72, with a pair of rows 73 and 74, of rollers, spaced apart by means of a thrust ring 75. The thrust ring 75 is provided with an inner annular groove 76 which faces toward a corresponding annular groove 77 in the periphery of the shaft 72. Within both of the grooves 76 and 77, is disposed a generally annular but polygonally shaped wire ring 78 (known as a "kinked wire"), which securely holds the ring 75 in place, and allows for transmission of thrust between the shaft 72 and one of the rows of rollers 73 or 74. The shaft 92 is of straight, single diameter, with no shoulder, but has a snap ring 79 in cylindrical groove 80, for engagement against a mounting surface (not shown), like the surface 33 of FIG. 1, for example, either with or without a hardened thrust washer therebetween (not shown).

Figure 2:
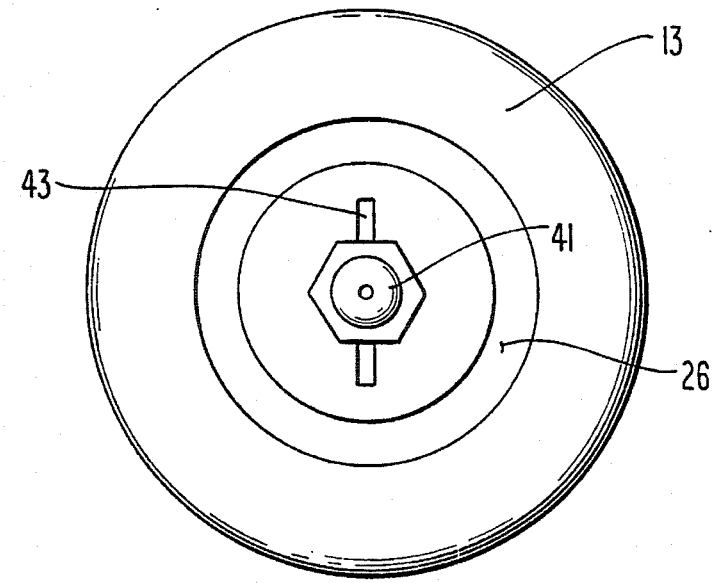
FIG. 2 is an end view of the cam follower assembly of FIG. 1, taken from a left end thereof as viewed in FIG. 1.
Figure 5:
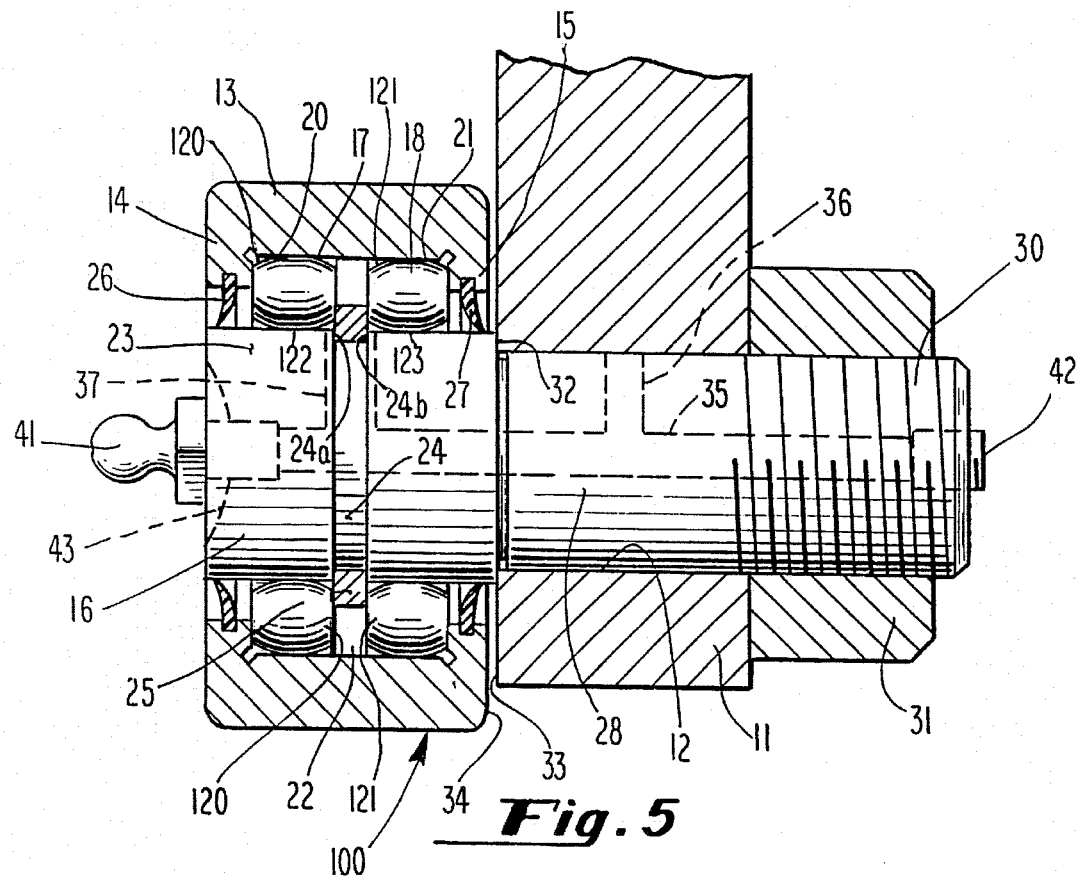
FIG. 5 is a longitudinal sectional view of an alternate embodiment of a cam follower assembly in accordance with this invention, taken through the cam follower, wherein the assembly is mounted on a carrier member and secured thereto, by a suitable fastening member, with the carrier member being partially fragmentally illustrated in phantom.

FIG. 5 shows an alternate embodiment of a cam follower assembly 100 according to the present invention. The cam follower assembly 100 is similar to that shown in FIGS. 1 and 2. The cam follower assembly 100 comprises additional means for facilitating the distribution of the thrust load in order to minimize end loading of thrust loads and promote a smoother operating assembly. Where an element is the same as that described above in connection with the FIG. 1–FIG. 4 embodiments, the same reference numeral will be used.

In FIG. 5, bearing rollers 117 and 118 are shown provided with crowned end portions 120 and 121, respectively. The bearing rollers 117 and 118 are shown having shaft-contacting outer peripheral surfaces, 122 and 123, respectively. The peripheral surfaces 122 and 123 of the bearing rollers 117 and 118, respectively, are provided to contact the peripheral surface of the shaft 16 without intrusion into the lubrication channel 37. This configuration maintains the ends of the bearing rollers 117 and 118 from fatigue under misaligned conditions.

Figure 6:
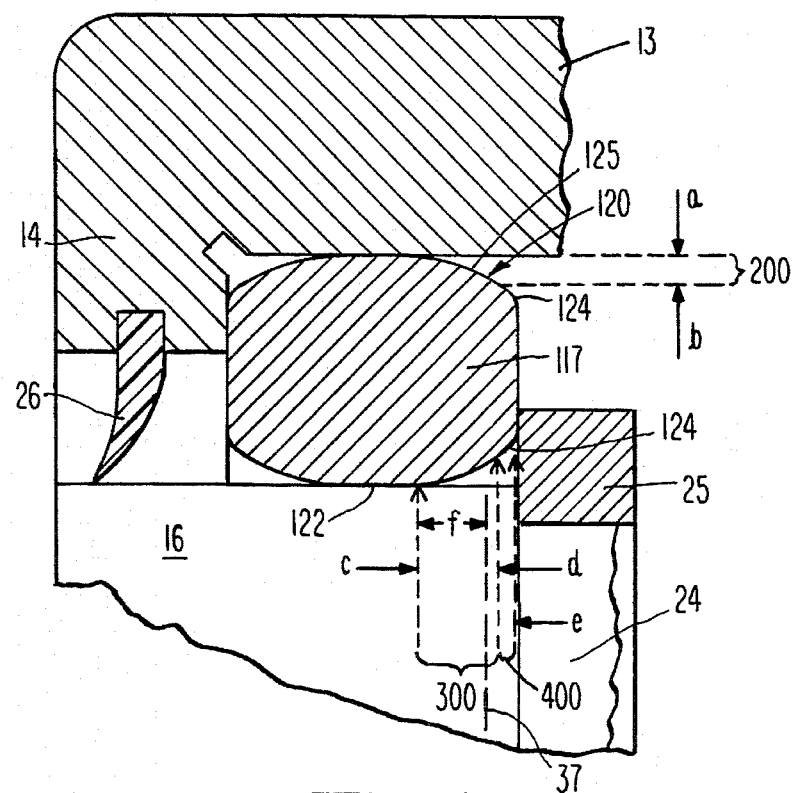
FIG. 6 is an enlarged view showing one of the rollers of the embodiment shown in FIG. 5.

In the enlarged sectional view of FIG. 6, the bearing roller 117 is shown having a crowned end portion 120 which comprises a corner radius 124 and a crown radius 125. While bearing roller 117 is described, it will be understood that the same description and operation can apply to bearing roller 118. A crown drop dimension 200 and a crown width dimension which is defined by the width of the crown radius and the width of the corner radius, the aforementioned widths being represented by reference numerals 300 and 400 respectively and are also indicated in FIG. 6. The crown drop 200 is indicated by the distance between arrows "a" and "b", while the crown width is the distance from the point at which the drop begins, "c", to a gauge point "d" and the distance across "d" and "e". The preferred crown drop and crown width will be such that the axial ends of the rollers 117 and 118 will comprise a suitable area for thrust-engaging contact with the flanges 14 and 15 of the bearing outer ring 13, and with the annular thrust ring 25. The preferred crown width will be of a dimension suitable for maintaining the roller surfaces 122 and 123 a distance "f" away from the lubrication channel 37.

It will be apparent from the foregoing that various modifications may be made in the details of construction, as well as in the use and operation of the present invention, all within the spirit and scope of the invention as claimed.

What is claimed is:

1. A cam follower assembly comprising a bearing outer ring and an inner bearing member; with the bearing outer ring having a cylindrical inner surface disposed between inwardly directed flanges at axially spaced apart ends thereof and defining a cylindrical race for cylindrical bearing rollers therein, said inwardly directed flanges each having an inner surface disposed in perpendicular relation to said cylindrical inner surface;

with said inner bearing member comprising a cylindrical member having a cylindrical outer periphery and mounting shaft extending axially from an end thereof;

a pair of generally parallel rows of bearing rollers mounted in axially spaced-apart relation defining a space there between and between the cylindrical outer periphery of said inner bearing member and the cylindrical inner periphery of the bearing outer ring;

a generally annular groove on the outer periphery of said inner bearing member;

with thrust means disposed in said groove and carried thereby and extending radially outwardly thereof into the space between the rows of bearing rollers, for contact with and thrust engagement with adjacent ends of said bearing rollers, with said thrust means, said pair of rows of bearing rollers and said annular groove between said rows of bearing rollers cooperating to define means for accommodating axial thrust through row of bearing rollers in either axial direction;

wherein said inner bearing member is provided with lubricating means comprising a generally longitudinally directed lubrication channel, and a transverse roller lubrication channel communicating therewith, said transverse roller lubrication channel being longitudinally wider than the thickness of said annular groove of the shaft inner bearing member and being provided in communicating relation on opposite sides of said annular groove with said cylindrical race, for lubrication of said bearing outer ring, said inner bearing member, and said pair of rows of bearing rollers from the transverse channel;

said bearing rollers each having crowned end portions provided at each axial end thereof, wherein each said crowned end portion comprises a crown radial portion and a corner radial portion, said crown radial portion and said corner radial portion together defining a crown width, and wherein said crown width comprises a unit dimension at least as great as the width of said transverse lubrication channel extends past each side of said annular groove and is suitable for maintaining said cylindrical peripheral roller surface a predetermined distance from said transverse roller lubrication channel to facilitate the operation of said bearing assembly by preventing said bearing rollers from contacting said transverse lubrication channel;

with said mounting shaft having fastening means thereon for facilitating the fastening of said shaft to a carrier member for movement therewith;

wherein said thrust means accommodates a first thrust load transmitted from the shaft in one direction through one of the parallel rows of bearing rollers, and accommodates a second thrust load transmitted from the shaft in the opposite direction through the other parallel row of bearing rollers; and wherein said bearing outer ring ultimately transmits a thrust load to the mounting shaft of said inner bearing member through said thrust means by engagement of said flange inner surface with one of the parallel rows of bearing rollers.

2. The assembly of claim 1, wherein the end of said bearing member closest to said mounting shaft has a mounting shoulder which protrudes axially beyond the adjacent end of the bearing outer ring.

3. The assembly of claim 2, wherein the end of said bearing member closest to said mounting shaft is, in relation to said mounting shaft axis, radially greater than said mounting shaft, and whereby said shoulder provides means for compressive axial engagement against a carrier member to which said bearing assembly is adapted to be mounted.

4. The assembly of claim 1, wherein the end of said bearing member closest to said mounting shaft is, in relation to said mounting shaft axis, radially greater than said mounting shaft.

5. The assembly of claim 1, wherein said inner bearing member is provided with a generally longitudinally directed lubrication channel extending longitudinally into said mounting shaft, and with a second transverse lubrication channel comprising a second transverse shaft lubrication channel communicating therewith, said second transverse shaft lubrication channel providing means for lubricating through internal passages of the carrier member in which it is mounted.

6. The assembly of claim 1, wherein each said flange defines a generally radially inwardly directed annular portion.

7. The assembly of claim 6, wherein said annular portions are provided with annular grooves therein, with bearing seals being disposed in the grooves and mounted in wiping contact at opposite ends of the outer periphery of said inner bearing member, said bearing seals being carried in part within said annular grooves and extending beyond the flanges of the bearing outer ring.

8. The assembly of claim 1, wherein said thrust means is a split ring comprising means facilitating opening the ring for installation thereof.

9. The assembly of claim 1, wherein the thrust means comprises a thrust ring.

10. The assembly of claim 1, wherein the thrust means comprises:

(a) a ring disposed about the inner bearing member and having a circumferential annular groove on its inner periphery, opening toward the annular groove on the outer periphery of the inner bearing member; and (b) a connector member disposed in both said annular grooves and connecting said ring to said inner bearing member, against relative axial movement.

11. The assembly of claim 10, wherein said connector member comprises a generally annularly configured polygonal, kinked wire member.

12. The assembly of claim 1, wherein said rows of bearing rollers are rows of circumferentially spaced-apart rollers, and wherein said assembly includes means for facilitating lubricant storage space, said means comprising roller cage means between said bearing outer ring and said inner bearing member and including means spacing apart adjacent rollers in each said row.

13. The assembly of claim 1, wherein said thrust means is a thrust ring, wherein the end of said bearing member closest to said mounting shaft has a mounting shoulder which protrudes axially beyond the adjacent end of said outer bearing ring, wherein, the end of said bearing member closest to said mounting shaft is of a transverse width larger than the transverse width of said mounting shaft, whereby said shoulder provides means for compressive axial engagement against a carrier member to which it is adapted to be mounted, wherein said flanges each define generally radially inwardly directed annular portions, wherein said annular portions are provided with annular grooves therein, with bearing seals being disposed in the grooves and mounted in wiping contact at opposite ends of the outer periphery of said inner bearing member; and, with a second transverse shaft lubrication channel communicating with said longitudinally directed lubrication channel, said transverse shaft lubrication channel providing means for lubricating through internal passages of the carrier member in which it is mounted; wherein said mounting shoulder transmits to and receives a thrust load from said bearing outer ring through a single row of bearing rollers at one time.

14. The apparatus of claim 1, wherein proximate the adjacent end of said bearing outer ring closest to said mounting shaft, a mounting ring is disposed on said shaft, from a location axially spaced from the adjacent end of said bearing outer ring, said mounting ring disposed to maintain said bearing outer ring from contact with a mounting surface.

15. The apparatus of claim 1, wherein said thrust means comprises an annular ring member, and wherein said annular ring member transmits a thrust load to said outer bearing member through a bearing roller.

16. The apparatus of claim 1, wherein said thrust means comprises an annular ring member, and wherein said annular ring member receives a thrust load from said outer bearing member through a bearing roller.

17. The apparatus of claim 1, wherein said outer bearing member further includes pair of annular grooves disposed within its cylindrical inner surface at opposite axial ends thereof.

18. The apparatus of claim 1, including means to facilitate lubricant storage between said adjacent bearing rollers in a row.

19. The apparatus of claim 18, wherein said rows of bearing rollers are rows of circumferentially spaced-apart rollers, and wherein said lubricant storage facilitating means includes roller cage means disposed between said bearing outer ring and said inner bearing member, and further provides means spacing apart adjacent rollers in each said row.

20. The apparatus of claim 1, with said transverse roller lubrication channel being in communication with said space between rows of bearing rollers and said space between adjacent bearing rollers within a row.

* * * * *